(12) United States Patent
Tran et al.

(10) Patent No.: US 11,790,650 B2
(45) Date of Patent: Oct. 17, 2023

(54) CONTRASTIVE CAPTIONING FOR IMAGE GROUPS

(71) Applicant: Adobe Inc., San Jose, CA (US)

(72) Inventors: Quan Hung Tran, San Jose, CA (US); Long Thanh Mai, San Jose, CA (US); Zhe Lin, Fremont, CA (US); Zhuowan Li, Baltimore, MD (US)

(*) Notice: Subject to any disclaimer, the term of this patent is extended or adjusted under 35 U.S.C. 154(b) by 366 days.

(21) Appl. No.: 16/998,876

(22) Filed: Aug. 20, 2020

(65) Prior Publication Data

US 2022/0058390 A1    Feb. 24, 2022

(51) Int. Cl.
| | |
|---|---|
| *G06V 20/30* | (2022.01) |
| *G06F 16/55* | (2019.01) |
| *G06F 16/535* | (2019.01) |
| *G06V 10/82* | (2022.01) |
| *G06F 40/205* | (2020.01) |
| *G06V 10/75* | (2022.01) |
| *G06F 18/214* | (2023.01) |

(52) U.S. Cl.
CPC ............ *G06V 20/30* (2022.01); *G06F 16/535* (2019.01); *G06F 16/55* (2019.01); *G06F 18/214* (2023.01); *G06F 40/205* (2020.01); *G06V 10/751* (2022.01); *G06V 10/82* (2022.01)

(58) Field of Classification Search
None
See application file for complete search history.

(56) References Cited

U.S. PATENT DOCUMENTS

2018/0373979 A1*  12/2018  Wang ..................... G06V 10/82

OTHER PUBLICATIONS

Yuille, A.—"Context-Aware Group Captioning via Self-Attention and Contrastive Features"—arXiv—Apr. 2020, pp. 1-19 (Year: 2020).*

Li, Z., Tran, Q., Mai, L., Lin, Z., & Yuille, A. (Apr. 7, 2020). Context-Aware Group Captioning via Self-Attention and Contrastive Features. arXiv preprint arXiv:2004.03708.

Anderson, P., He, X., Buehler, C., Teney, D., Johnson, M., Gould, S., & Zhang, L. (2018). Bottom-up and top-down attention for image captioning and visual question answering. In Proceedings of the IEEE conference on computer vision and pattern recognition (pp. 6077-6086).

(Continued)

*Primary Examiner* — Bernard Krasnic
(74) *Attorney, Agent, or Firm* — SHOOK, HARDY & BACON L.L.P.

(57) ABSTRACT

A group captioning system includes computing hardware, software, and/or firmware components in support of the enhanced group captioning contemplated herein. In operation, the system generates a target embedding for a group of target images, as well as a reference embedding for a group of reference images. The system identifies information in-common between the group of target images and the group of reference images and removes the joint information from the target embedding and the reference embedding. The result is a contrastive group embedding that includes a contrastive target embedding and a contrastive reference embedding with which to construct a contrastive group embedding, which is then input to a model to obtain a group caption for the target group of images.

20 Claims, 7 Drawing Sheets

(56) References Cited

OTHER PUBLICATIONS

Andreas, J., & Klein, D. (2016). Reasoning about pragmatics with neural listeners and speakers. arXiv preprint arXiv:1604.00562.
Bai, S., & An, S. (2018). A survey on automatic image caption generation. Neurocomputing, 311, 291-304.
Cao, Y., Xu, J., Lin, S., Wei, F., & Hu, H. (2019). Gcnet: Non-local networks meet squeeze-excitation networks and beyond. In Proceedings of the IEEE International Conference on Computer Vision Workshops (pp. 0-0).
Chen, F., Ji, R., Sun, X., Wu, Y., & Su, J. (2018). Groupcap: Group-based image captioning with structured relevance and diversity constraints. In Proceedings of the IEEE conference on computer vision and pattern recognition (pp. 1345-1353).
Chen, L., Zhang, H., Xiao, J., Nie, L., Shao, J., Liu, W., & Chua, T. S. (2017). Sca-cnn: Spatial and channel-wise attention in convolutional networks for image captioning. In Proceedings of the IEEE conference on computer vision and pattern recognition (pp. 5659-5667).
Dai, B., Fidler, S., Urtasun, R., & Lin, D. (2017). Towards diverse and natural image descriptions via a conditional gan. In Proceedings of the IEEE International Conference on Computer Vision (pp. 2970-2979).
Dai, B., & Lin, D. (2017). Contrastive learning for image captioning. In Advances in Neural Information Processing Systems (pp. 898-907).
Dehghani, M., Rothe, S., Alfonseca, E., & Fleury, P. (Nov. 2017). Learning to attend, copy, and generate for session-based query suggestion. In Proceedings of the 2017 ACM on Conference on Information and Knowledge Management (pp. 1747-1756).
Devlin, J., Chang, M. W., Lee, K., & Toutanova, K. (2018). Bert: Pre-training of deep bidirectional transformers for language understanding. arXiv preprint arXiv:1810.04805.
Hochreiter, S., & Schmidhuber, J. (1997). Long short-term memory. Neural computation, 9(8), 1735-1780.
Hossain, M. Z., Sohel, F., Shiratuddin, M. F., & Laga, H. (2019). A comprehensive survey of deep learning for image captioning. ACM Computing Surveys (CSUR), 51(6), 1-36.
Huang, T. H., Ferraro, F., Mostafazadeh, N., Misra, I., Agrawal, A., Devlin, J., . . . & Zitnick, C. L. (Jun. 2016). Visual storytelling. In Proceedings of the 2016 Conference of the North American Chapter of the Association for Computational Linguistics: Human Language Technologies (pp. 1233-1239).
Jiang, J. Y., & Wang, W. (Oct. 2018). RIN: reformulation inference network for context-aware query suggestion. In Proceedings of the 27th ACM International Conference on Information and Knowledge Management (pp. 197-206).
Jiang, W., Ma, L., Jiang, Y. G., Liu, W., & Zhang, T. (2018). Recurrent fusion network for image captioning. In Proceedings of the European Conference on Computer Vision (ECCV) (pp. 499-515).
Johnson, J., Karpathy, A., & Fei-Fei, L. (2016). Densecap: Fully convolutional localization networks for dense captioning. In Proceedings of the IEEE conference on computer vision and pattern recognition (pp. 4565-4574).
Karpathy, A., & Fei-Fei, L. (2015). Deep visual-semantic alignments for generating image descriptions. In Proceedings of the IEEE conference on computer vision and pattern recognition (pp. 3128-3137).
Kazemzadeh, S., Ordonez, V., Matten, M., & Berg, T. (Oct. 2014). Referitgame: Referring to objects in photographs of natural scenes. In Proceedings of the 2014 conference on empirical methods in natural language processing (EMNLP) (pp. 787-798).
Kim, D. J., Choi, J., Oh, T. H., & Kweon, I. S. (2019). Dense relational captioning: Triple-stream networks for relationship-based captioning. In Proceedings of the IEEE Conference on Computer Vision and Pattern Recognition (pp. 6271-6280).
Krizhevsky, A., Sutskever, I., & Hinton, G. E. (2012). Imagenet classification with deep convolutional neural networks. In Advances in neural information processing systems (pp. 1097-1105).

Li, L. H., Yatskar, M., Yin, D., Hsieh, C. J., & Chang, K. W. (2019). Visualbert: A simple and performant baseline for vision and language. arXiv preprint arXiv:1908.03557.
Li, Y., Jin, X., Mei, J., Lian, X., Yang, L., Xie, C., . . . & Yuille, A. L. (2020). Neural Architecture Search for Lightweight Non-Local Networks. In Proceedings of the IEEE/CVF Conference on Computer Vision and Pattern Recognition (pp. 10297-10306).
Liu, C., Mao, J., Sha, F., & Yuille, A. (Feb. 2017). Attention correctness in neural image captioning. In Proceedings of the Thirty-First AAAI Conference on Artificial Intelligence (pp. 4176-4182).
Liu, S., Zhu, Z., Ye, N., Guadarrama, S., & Murphy, K. (2017). Improved image captioning via policy gradient optimization of spider. In Proceedings of the IEEE international conference on computer vision (pp. 873-881).
Liu, X., Xu, Q., & Wang, N. (2019). A survey on deep neural network-based image captioning. The Visual Computer, 35(3), 445-470.
Liu, X., Li, H., Shao, J., Chen, D., & Wang, X. (2018). Show, tell and discriminate: Image captioning by self-retrieval with partially labeled data. In Proceedings of the European Conference on Computer Vision (ECCV) (pp. 338-354).
Lu, J., Batra, D., Parikh, D., & Lee, S. (2019). Vilbert: Pretraining task-agnostic visiolinguistic representations for vision-and-language tasks. In Advances in Neural Information Processing Systems (pp. 13-23).
Lu, J., Xiong, C., Parikh, D., & Socher, R. (2017). Knowing when to look: Adaptive attention via a visual sentinel for image captioning. In Proceedings of the IEEE conference on computer vision and pattern recognition (pp. 375-383).
Luo, R., Price, B., Cohen, S., & Shakhnarovich, G. (2018). Discriminability objective for training descriptive captions. In Proceedings of the IEEE Conference on Computer Vision and Pattern Recognition (pp. 6964-6974).
Luo, R., & Shakhnarovich, G. (2017). Comprehension-guided referring expressions. In Proceedings of the IEEE Conference on Computer Vision and Pattern Recognition (pp. 7102-7111).
Mao, J., Huang, J., Toshev, A., Camburu, O., Yuille, A. L., & Murphy, K. (2016). Generation and comprehension of unambiguous object descriptions. In Proceedings of the IEEE conference on computer vision and pattern recognition (pp. 11-20).
Ordonez, V., Kulkarni, G., & Berg, T. L. (2011). Im2text: Describing images using 1 million captioned photographs. In Advances in neural information processing systems (pp. 1143-1151).
Park, D. H., Darrell, T., & Rohrbach, A. (2019). Robust change captioning. In Proceedings of the IEEE international conference on computer vision (pp. 4624-4633).
Rennie, S. J., Marcheret, E., Mroueh, Y., Ross, J., & Goel, V. (2017). Self-critical sequence training for image captioning. In Proceedings of the IEEE Conference on Computer Vision and Pattern Recognition (pp. 7008-7024).
Shetty, R., Rohrbach, M., Anne Hendricks, L., Fritz, M., & Schiele, B. (2017). Speaking the same language: Matching machine to human captions by adversarial training. In Proceedings of the IEEE International Conference on Computer Vision (pp. 4135-4144).
Sordoni, A., Bengio, Y., Vahabi, H., Lioma, C., Grue Simonsen, J., & Nie, J. Y. (Oct. 2015). A hierarchical recurrent encoder-decoder for generative context-aware query suggestion. In Proceedings of the 24th ACM International on Conference on Information and Knowledge Management (pp. 553-562).
Suhr, A., Lewis, M., Yeh, J., & Artzi, Y. (Jul. 2017). A corpus of natural language for visual reasoning. In Proceedings of the 55th Annual Meeting of the Association for Computational Linguistics (vol. 2: Short Papers) (pp. 217-223).
Suhr, A., Zhou, S., Zhang, A., Zhang, I., Bai, H., & Artzi, Y. (2018). A corpus for reasoning about natural language grounded in photographs arXiv preprint arXiv:1811.00491.
Sun, C., Myers, A., Vondrick, C., Murphy, K., & Schmid, C. (2019). Videobert: A joint model for video and language representation learning. In Proceedings of the IEEE International Conference on Computer Vision (pp. 7464-7473).

(56) References Cited

OTHER PUBLICATIONS

Tan, H., Dernoncourt, F., Lin, Z., Bui, T., & Bansal, M. (2019). Expressing visual relationships via language. arXiv preprint arXiv:1906 07689.
Vaswani, A., Shazeer, N., Parmar, N., Uszkoreit, J., Jones, L., Gomez, A. N., . . . & Polosukhin, I. (2017). Attention is all you need. In Advances in neural information processing systems (pp. 5998-6008).
Vedantam, R., Bengio, S., Murphy, K., Parikh, D., & Chechik, G. (2017). Context-aware captions from context-agnostic supervision. In Proceedings of the IEEE Conference on Computer Vision and Pattern Recognition (pp. 251-260).
Vinyals, O., Toshev, A., Bengio, S., & Erhan, D. (2015). Show and tell: A neural image caption generator. In Proceedings of the IEEE conference on computer vision and pattern recognition (pp. 3156-3164).
Wang, C., Yang, H., Bartz, C., & Meinel, C. (Oct. 2016). Image captioning with deep bidirectional LSTMs. In Proceedings of the 24th ACM international conference on Multimedia (pp. 988-997).
Wang, X., Girshick, R., Gupta, A., & He, K. (2018). Non-local neural networks. In Proceedings of the IEEE conference on computer vision and pattern recognition (pp. 7794-7803).
Wu, B., Xiong, C., Sun, M., & Liu, Z. (Apr. 2018). Query suggestion with feedback memory network. In Proceedings of the 2018 World Wide Web Conference (pp. 1563-1571).
Xu, K., Ba, J., Kiros, R., Cho, K., Courville, A., Salakhudinov, R., . . . & Bengio, Y. (Jun. 2015). Show, attend and tell: Neural image caption generation with visual attention. In International conference on machine learning (pp. 2048-2057).
Yang, L., Tang, K., Yang, J., & Li, L. J. (2017). Dense captioning with joint inference and visual context. In Proceedings of the IEEE Conference on Computer Vision and Pattern Recognition (pp. 2193-2202).
Yao, T., Pan, Y., Li, Y., & Mei, T. (2018). Exploring visual relationship for image captioning. In Proceedings of the European conference on computer vision (ECCV) (pp. 684-699).
You, Q., Jin, H., Wang, Z., Fang, C., & Luo, J. (2016). Image captioning with semantic attention. In Proceedings of the IEEE conference on computer vision and pattern recognition (pp. 4651-4659).
Yu, L., Poirson, P., Yang, S., Berg, A. C., & Berg, T. L. (Oct. 2016). Modeling context in referring expressions. In European Conference on Computer Vision (pp. 69-85). Springer, Cham.
Yu, L., Tan, H., Bansal, M., & Berg, T. L. (2017). A joint speaker-listener-reinforcer model for referring expressions. In Proceedings of the IEEE Conference on Computer Vision and Pattern Recognition (pp. 7282-7290).
Yue, K., Sun, M., Yuan, Y., Zhou, F., Ding, E., & Xu, F. (2018). Compact generalized non-local network. In Advances in Neural Information Processing Systems (pp. 6510-6519).
Zha, Z. J., Yang, L., Mei, T., Wang, M., & Wang, Z. (Oct. 2009). Visual query suggestion. In Proceedings of the 17th ACM international conference on Multimedia (pp. 15-24).
Zha, Z. J., Yang, L., Mei, T., Wang, M., Wang, Z., Chua, T. S., & Hua, X. S. (2010). Visual query suggestion: Towards capturing user intent in internet image search. ACM Transactions on Multimedia Computing, Communications, and Applications (TOMM), 6(3), 1-19.
Zhu, Z., Xu, M., Bai, S., Huang, T., & Bai, X. (2019). Asymmetric non-local neural networks for semantic segmentation. In Proceedings of the IEEE International Conference on Computer Vision (pp. 593-602).

\* cited by examiner

CONTRASTIVE CAPTIONING FOR IMAGE GROUPS

TECHNICAL FIELD

Aspects of the disclosure are related to computer vision technology and group captioning.

BACKGROUND

Image captioning in computer vision relates to the task of generating natural language descriptions for single images. Computer vision solutions have progressed to the point where they are capable of generating reliable image captions for individual images.

Various image captioning approaches rely upon deep learning advances and a combination of convolutional neural network and recurrent neural network (CNN-RNN) architectures. The visual features of an input image are extracted using a CNN, while the RNN is used to generate a natural language description of the input image.

Recent works leverage the contextual and contrastive information from additional images to enable more diverse and discriminative captioning results. Referring expression generation is a related problem, which aims to generate natural language descriptions for a target object in an image. Contrastive modeling describes the target image region in contrast with other image regions by, for example, using relative location and feature differences to discriminate the target object. Maximum Mutual Information (MMI) training is employed in some cases to maximize the probability of a generated expression describing a specific region, as opposed to describing other regions.

Unfortunately, such solutions pertain mainly to generating captions for a single image, rather than for a group of images. Group captioning pertains to formulating captions for groups of images. Examples of group captioning include summarizing personal photo albums for social sharing, as well as understanding user intent from viewed or clicked images.

It is often the case that the target image group to be captioned naturally belongs to a larger set that provides context for the subset. For example, in text-based image retrieval applications, given a group of user-interested images and other images returned by the search engine, user hidden preferences could be predicted by contrasting the two groups and suggesting a new (or refined) search query accordingly. Capturing such context remains a challenging problem in computer vision because the differences between two groups of images are hard to ascertains. This problem results in poorly refined search queries that add little or nothing to the user experience or the performance of the image search.

BRIEF SUMMARY

Improved techniques for generating captions for image groups are disclosed herein that are context-aware and, as such, produce accurate and useful group captions that distinguish one group of images from another. In an implementation, a group captioning system generates a target embedding for a group of target images, as well as a reference embedding for a group of reference images. The group captioning system identifies information in-common between the group of target images and the group of reference images and removes the joint information from the target embedding and the reference embedding. The result includes a contrastive target embedding and a contrastive reference embedding with which to construct a contrastive group embedding. The contrastive group embedding is supplied as input to a machine learning model to obtain a group caption for the target group of images.

This Brief Summary is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure are better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
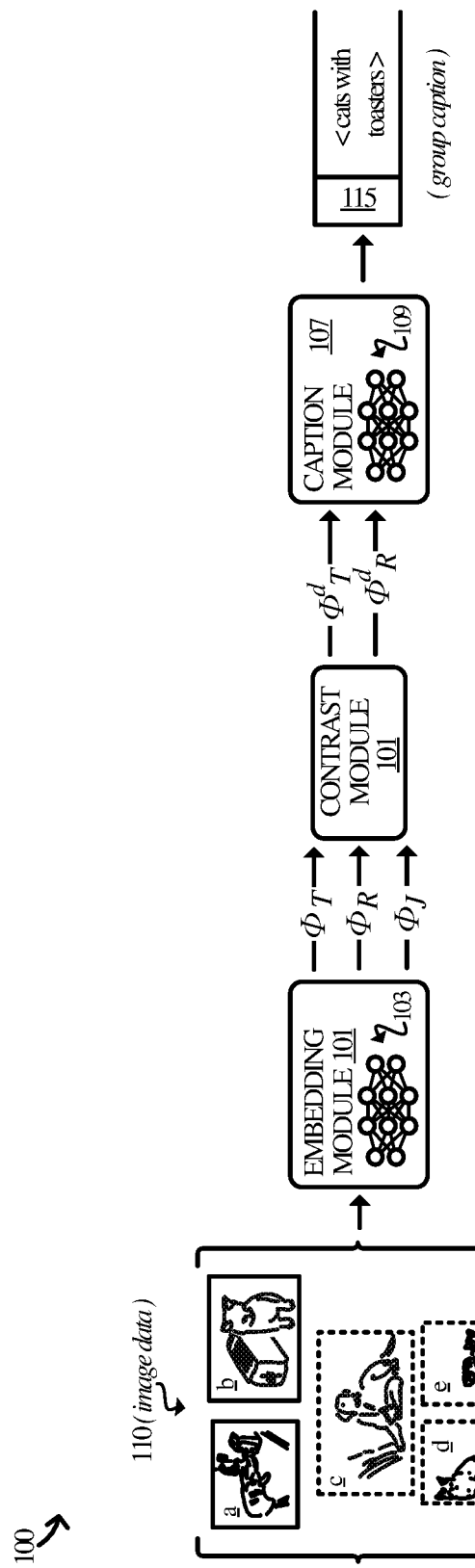
FIG. 1 illustrates a group captioning system and a related operational context in an implementation.

Improved techniques for generating captions for image groups are disclosed herein that are context-aware and, as such, produce accurate and useful group captions that distinguish one group of images from another. The disclosed context-aware group captioning is achieved in various implementations by leveraging contrastive feature construction to encode an image group into a context-aware feature representation. The context-aware feature representation (or embedding) effectively summarizes relevant common information in the groups while capturing discriminative information between the target and reference group. The contrast is achieved by removing from the group embeddings joint information found in-common between the target image group and the reference image group, thereby highlighting the differences between the two groups.

In various implementations, a group captioning system includes computing hardware, software, and/or firmware components in support of the enhanced group captioning contemplated herein. In operation, the group captioning system generates a target embedding for a group of target images, as well as a reference embedding for a group of reference images. The group captioning system identifies information in-common between the group of target images and the group of reference images and removes the joint information from the target embedding and the reference embedding. The result includes a contrastive target embedding and a contrastive reference embedding with which to construct a contrastive group embedding. The contrastive group embedding is supplied as input to a machine learning model to obtain a group caption for the target group of images.

In some implementations, the machine learning model is trained on a dataset comprising target groups and reference groups. In such scenarios, the target groups include a group of target images and a group caption for the group of target images, while each of the reference groups corresponds to a different one of the target groups. The reference groups include a group of reference images that provide context for the group of target images.

Generating the dataset on which to train the model begins with a set of training images and a corresponding set of image captions. That is, each image in the set corresponds an individual image caption that describes the image. A model training system parses each image caption in the set into a scene graph of its corresponding image. The model training system then identifies the target groups from within the set of training images by finding subsets of training images that have a shared scene graph. The model training system also identifies the reference groups from within the set of training images. Each of the reference groups corresponds to a different one of the target groups and includes a different subset of the training images having scene graphs that only partially overlap with the shared scene graph of a corresponding one of the target groups.

The model training system then generates the group caption for each of the target groups based at least on the shared scene graph for a given target group. Training sets are formed by each target group, its group caption, and its corresponding reference group. The group caption represents the ground truth description for the group of target images, while the reference group provides the context. The training sets are used to train the model such that, once trained, the model is able to generate group captions for new groups of target images.

Figure 7:
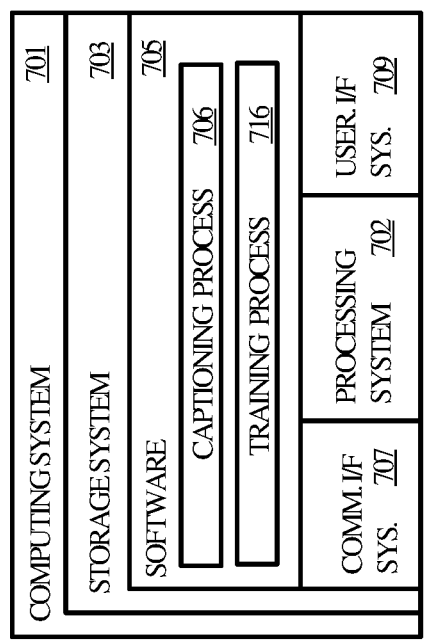
FIG. 7 illustrates a computing system suitable for implementing the various systems, modules, architectures, processes, scenarios, and sequences discussed below with respect to the Figures.

FIG. 1 illustrates a group captioning system 100 in an implementation. Group captioning system 100 includes embedding engine 10, contrast module 105, and caption module 107. Group captioning system 100 is implemented in hardware, software, and/or firmware, and in the context of on one or more computing devices, of which computing system 701 in FIG. 7 is representative.

Broadly speaking, group captioning system 100 takes image data as input, of which image data 110 is representative, and identifies per-group captions for image groups in the data. That is, group captioning system 100 is capable of producing a single caption that describes the images in a group, as opposed to a caption that describes only a single image.

Group captioning system 100 also achieves context-aware group captioning by leveraging contrastive feature construction to encode an image group into a context-aware feature representation. A context-aware feature representation effectively summarizes the relevant common information in a group of images, while capturing discriminative information between the target images and reference images in the group.

More specifically, embedding module 101 is representative of any computing hardware, software, and/or firmware component(s) capable of taking image data 110 as input and producing feature embeddings for image groups in the data.

The feature embeddings include vector representations of the image groups and include a target embedding for the target images in the group (target group), a reference embedding for the reference images in the group (reference group), and a joint embedding for a combination of the target group and the reference group. The target embedding for the target images includes a vector representation of the target images, while the reference embedding includes a vector representation of the reference images. The joint embedding therefore also includes a vector representation. Embedding module 101 includes a machine learning model 103 capable of taking image data 110 as input and producing the relevant embeddings. In some implementations, heuristic techniques are substituted for or combined with machine learning model 103 to produce the feature embeddings.

In some cases, machine learning model 103 in embedding module 101 includes a self-attention layer configured to identify and promote prominent features of image groups. The self-attention layer serves to promote the more prominent features or images of a set when determining the relevant embedding. For example, the self-attention layer a very prominent feature in a group of target images are represented in the target embedding to a greater degree than a less-prominent feature. Alternatives to self-attention layers include average pooling for feature aggregation.

Contrast module 105 is representative of any computing hardware, software, and/or firmware component(s) capable of taking feature embeddings as input and producing contrastive group embeddings as output. The contrastive group embeddings also include vector representations produced by one or more operations on the feature embeddings supplied as input to contrast module 105. Contrast module 105 is implemented as a model, heuristically, or any combination thereof.

The target embedding, reference embedding, and joint embedding produced by embedding module 101 include the input to contrast module 105. Contrast module 105 takes the embeddings as input and produces a contrastive group embedding as output. The contrastive group embedding includes a contrastive target embedding and a contrastive reference embedding, both of which are vector representations. In some implementations, contrast module 105 accomplishes this by identifying and removing joint information in-common between the group of target images and the group of reference images (i.e. by subtracting the joint embedding from the target embedding and the reference embedding respectively).

The contrastive group embedding includes the contrastive target embedding and the contrastive reference embedding. The contrastive embeddings are concatenated with each other in some scenarios and provided in a non-concatenated form in other scenarios. The contrastive group embedding in some examples includes the (non-contrastive) target embedding and reference embedding in either a concatenated or non-concatenated form. The contrastive group embedding is supplied as input to caption module 107.

Caption module 107 is implemented by computing hardware, software, and/or firmware component(s) capable of taking contrastive embeddings as input and providing group captions as output. Caption module 107 includes a machine learning model 109 trained on such correlations and capable of producing natural language captions either directly or indirectly from the input. Some implementations substitute heuristic techniques for machine learning model 109, or combine heuristic techniques with machine learning model 109, to generate the feature embeddings. Machine learning model 109 is implemented separately from machine learning model 103 in some cases and integrated with machine learning model 103 in other cases.

In some implementations, machine learning model 103 and/or machine learning model 109 are trained on a dataset that includes target groups and reference groups. Each target group includes a group of target images and a group caption for the group of target images, while each reference group corresponds to a different one of the target groups and includes a group of reference images.

Generating the dataset on which to train the model(s) begins by parsing the captions in a training set into scene graphs. The training set includes training images and corresponding image captions, where each caption corresponds to and describes a single image in the set. Subsets of images are then grouped into target groups and reference groups based on the extent to which the scene graph of a given image overlaps completely or partially with the scene graphs of other images. The target groups are composed of subsets of images that have shared scene graphs with respect to each other. Each reference group includes a subset of images with scene graphs that only partially overlap with the scene graph of a corresponding target group. The reference groups thereby provide context for their corresponding target groups.

The scene graphs for each of the target groups is used to generate the group caption for a given group of target images. Training sets are formed by the target groups, their corresponding reference groups, and their associated group captions. The training sets are then fed to machine learning model 109 in a training mode using the group captions as ground-truth descriptions for the target groups.

In some implementations, the group caption produced by machine learning model 109 is used to refine a natural language query. For example, a search engine returns a set of images in response to an initial natural language query submitted to the search engine. A user clicking-on or otherwise paying attention to a subset of the images serves to designate or identify the subset as target images. The other images shown to the user but not selected include reference images with respect to the target images.

Using the target images and reference images as input, group captioning system 100 identifies a group caption that adequately summarizes the information in the target group of images, while including some information that provides a contrast with the reference group. As an example, a user submits an initial query for "cats," which returns a set of images of cats. The user clicks on only a subset of the images, thereby expressing interest in the subset of images, but not the other images.

In one example, the subset of images (i.e. target group) consist of images with cats alongside toasters, while the reference group lacks toasters. The group captioning system 100 is capable of generating a group caption for the target group that both summarizes the group and distinguishes it from the reference group such as "cats and toasters." The search engine is then queried again but using the refined search terms to obtain image results focused on cats and toasters which, while somewhat absurd, serves to highlight the technical effects of the improved group captioning contemplated herein.

In another example, a user submits an initial query for "woman," which returns a set of images of women. The user clicks on only a subset of the images, thereby expressing interest in the subset of images, but not the other images.

In this case, the subset of images (i.e. target group) consist of images with women sitting in chairs, while the reference group lacks such scenes. The group captioning system 100 generates a group caption for the target group that both summarizes the group and distinguishes it from the reference group such as "woman sitting in chair." The search engine is then queried again but using the refined search terms to obtain image results focused on women sitting in chairs, rather than just women more generally, thereby helping to narrow the scope of the search.

Figure 2:
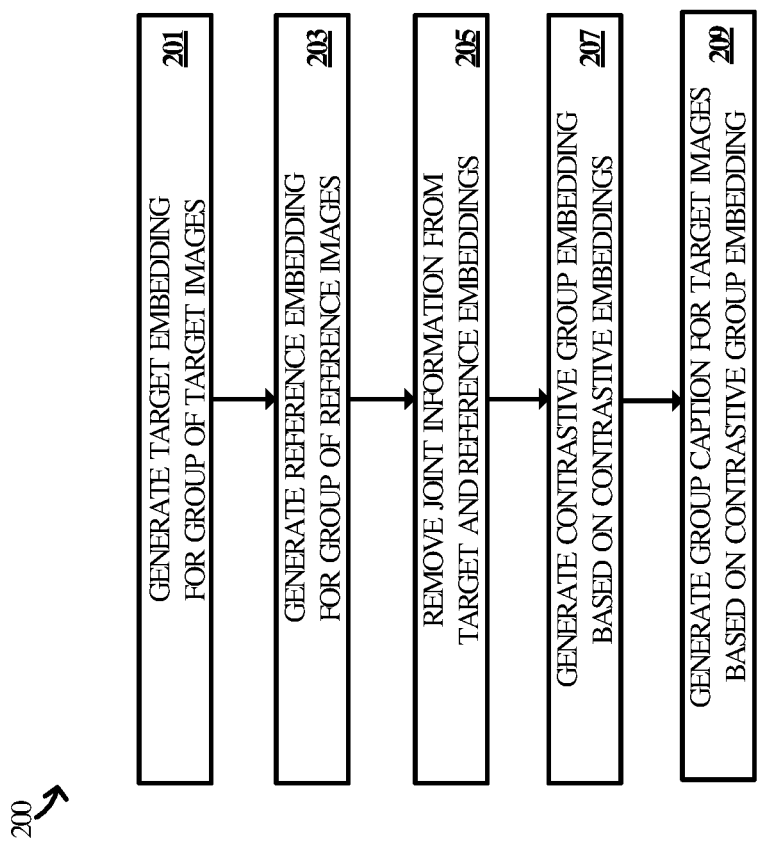
FIG. 2 illustrates a captioning process in an implementation.

In order to achieve the enhanced group captioning discussed above, the one or more computing devices that provide group captioning system 100 execute captioning process 200, illustrated in FIG. 2. The logic of captioning process 200 is implemented in the context of any of the hardware, software (e.g. program instructions), or firmware that include group captioning system 100. The logic, in the form of program instructions, circuitry, or the like, directs its host computing device(s) to operate as described for captioning process 200, referring parenthetically to the steps in FIG. 2 and in the operational context of FIG. 1.

In operation, captioning process 200 generates a target embedding for a group of target images (step 201) and generates a reference embedding for a group of reference images (step 203). In this example, image data 110 includes a set of images 110a, 110b, 110c, 110d, and 110e. It is assumed for exemplary purposes that image 110a and image 110b make up the target group, while image 110c, image 110d, and image 110e make up the reference group. Accordingly, embedding module 101 generates a target embedding, a reference embedding, and (optionally) a joint embedding. The various embeddings are represented symbolically in FIG. 1 as: $\Phi_T$, $\Phi_R$, and $\Phi_J$.

Captioning process 200 then removes the joint information in-common between the target images and the reference images to produce a contrastive target embedding and a contrastive reference embedding (step 205). Contrast module 105 produces the contrastive embeddings by, for example, subtracting the joint embedding from the target embedding and the reference embedding. The resulting derivative or difference embeddings are represented symbolically in FIG. 1 as follows: $\Phi^d_T$, $\Phi^d_T$.

Captioning process 200 generates a contrastive group embedding using the contrastive target embedding and the contrastive reference embedding (step 207) and generates a group caption based on the contrastive group embedding (step 209). The contrastive group embedding includes a concatenation of the contrastive target and reference embeddings, a sum of the embeddings, an average of the embeddings, or some other combination or variation thereof.

In FIG. 1, caption module 107 produces a group caption 115 that summarizes the target group effectively while contrasting it with the reference group. For example, the target group, which includes image 110a and image 110b, relate to cats and toasters, whereas the images in the reference group pertain to cats, but not toasters. The feature(s) related to the presence of the toaster in both image 110a and 110b is implicitly surfaced in the final embedding used by caption module 107 to find the group caption.

Figure 3:
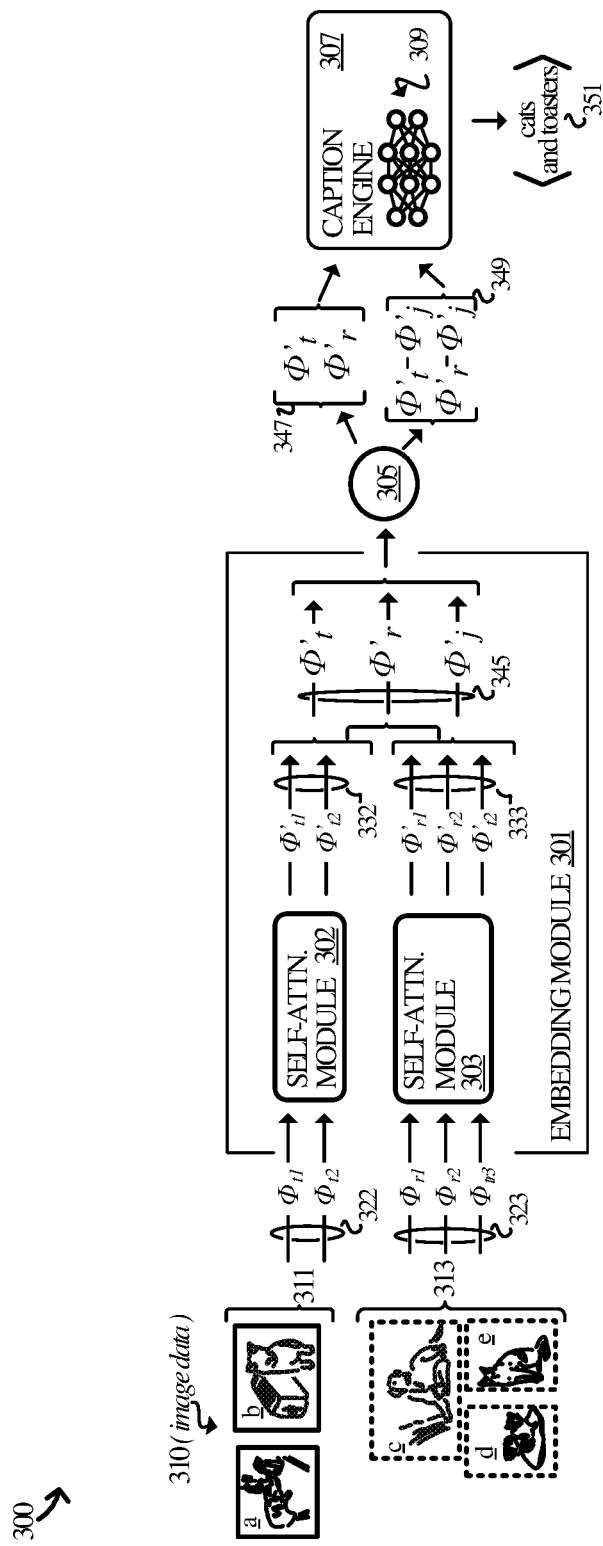
FIG. 3 illustrates a group captioning system and a related operational context in an implementation.

FIG. 3 illustrates group captioning system 300 in another implementation. Group captioning system 300 includes embedding module 301, contrast module 305, and caption module 307. Group captioning system 300 is be implemented in hardware, software, and/or firmware, and in the context of on one or more computing devices, of which computing system 701 in FIG. 7 is representative.

Embedding module 301 includes one or more self-attention modules, represented by self-attention module 302 and self-attention module 303. The self-attention modules are be implemented as one or more layers of an artificial neural network in embedding module 301. Group captioning system 300, via embedding module 301, contrast module 305, and caption module 307, takes image data as input, of which image data 310 is representative, and identifies per-group captions for image groups in the data.

Embedding module 301 is representative of any computing hardware, software, and/or firmware component(s) capable of taking image data 310 as input and producing context-aware feature embeddings via self-attention mechanisms. The feature embeddings include a target embedding for the target images in the group (target group), a reference embedding for the reference images in the group (reference group), and a joint embedding for a combination of the target group and the reference group.

Embedding module 301 includes a machine learning model (not shown) capable of taking image data 310 as input and producing the relevant embeddings. Self-attention modules 302 and 303 take initial feature embeddings as input for the individual images in proposed groups and generate enhanced feature embeddings having the prominent features of the images encoded therein such that they outweigh other less-prominent features. A self-attention layer is implemented via a transformer architecture. A transformer architecture relies on a grid of attention between elements of a set to learn a better representation. By learning the self-attention grid, the model is able to detect the prominent features as each element in the set "votes" for the importance of the other elements through the self-attention mechanism.

In various implementations, the self-attention grid assigns greater weights to the more prominent images in a set. The core computations of the transformer-based architecture are summarized as follows. The first step is calculating the contextualized features using a self-attention mechanism. Given the input features $\Phi$; three different sets of features: queries Q, keys K and values V are calculated using a linear transformation:

$$Q = W^Q \Phi + b^Q;$$

$$K = W^K \Phi + b^K; \text{ and }$$

$$V = W^V \Phi + b^V.$$

Then the self-attention grid is calculated by a scaled dot product between Q and K (the scaling factor d is the dimension of the vectors in Q and K). The self-attention layer uses this attention grid and the value matrix V to compute its outputs by:

$$\text{Attention }(Q, K, V) = \text{softmax}(QK^T/\sqrt{d})V$$

The self-attention output is then coupled with the residual signal to create the contextualized features $\Phi'$ by:

$$V' = V + \text{Attention}(Q, K, V); \text{ and}$$

$$\Phi' = V' + \max(0, V'W1 + b1) W2 + b2.$$

From this point, the process of transforming from the original features set $\Phi$ to the contextualized feature set $\Phi'$ is given by $\Phi' = F(\Phi)$. This formulation gives the contextualized set of features $\Phi'_t$ and $\Phi'_r$ by: $\Phi'_t = F_{st}(\Phi_t)$ $\Phi'_r = F_{sr}(\Phi_r)$.

Both sharing and not-sharing weights of $F_{st}$ and $F_{sr}$ are feasible, although sharing weights lead to better performance in some implementations. This is because the task of grouping target images is not different from the task of grouping reference images, and thus, the grouping model shares the same set of weights. Experimental data shows that the self-attention architecture provides a significant boost in performance compared to the average-pooling variant The enhanced feature embeddings for the individual images are then combined via averaging or other suitable operations to produce group embeddings for the target and reference groups. A joint embedding is also produced for the overall group and the group embeddings are supplied to contrast module 305 as input.

Contrast module 305 is representative of any computing hardware, software, and/or firmware component(s) capable of taking feature embeddings as input and producing contrastive embeddings as output. Contrast module 305 is implemented as a model, heuristically, or any combination thereof, and provides contrastive embeddings to caption module 307. Contrast module 305 produces a contrastive target embedding and a contrastive reference embedding by identifying and removing joint information in-common between the group of target images and the group of reference images (i.e. by subtracting the joint embedding from the target embedding and the reference embedding respectively).

Taking the representations provided by the self-attention modules for the target and reference groups, contrast module 305 concatenates features and/or subtracts features. To learn the difference between two groups of images, contrast module 305 first captures their similarity. By identifying the similarity between all the images, contrast module 305 removes the similarity portion from the target and reference group features to deduce a more discriminative representation. This process is formalized as follows.

The first step is learning the common information $\varphi'_c$ between all the images. This is done by applying the same self-attention mechanism described above to all the images as follows: $\Phi'_c = F_a([\Phi_t; \Phi_r])$; and $\varphi'_c = [1/(n_t + n_r)] \Sigma'_c$.

Then the joint information is removed from the group features $\varphi'_t$ and $\varphi'_r$ by subtraction to generate the contrastive/residual feature $\varphi^d_t$ and $\varphi^d_r$. The contrastive features $\varphi^d_t$ and $\varphi^d_r$ are concatenated with the group features $\varphi'_t$ and $\varphi'_r$, which are then fed into a long short-term memory recurrent neural network (LSTM-RNN). The contrastive features serve to focus on the difference between two image groups.

Referring still to FIG. 3, the contrastive target and reference embeddings are supplied as input to caption module 307. In some cases, the contrastive target embedding is concatenated with the reference embedding. The input includes the target embedding and reference embedding in some scenarios, in addition to the contrastive embeddings.

Caption module 307 is representative of any computing hardware, software, and/or firmware component(s) capable of taking contrastive embeddings as input and providing group captions as output. Caption module 307 includes a machine learning model 309 trained on such correlations and capable of producing natural language captions either directly or indirectly from the input. Some implementations combine heuristic techniques with, or substitute heuristic techniques for, machine learning model 309 to produce the feature embeddings. In addition, some implementations implement machine learning model 309 separately from any components of embedding module 301, including self-attention modules 302 and 303.

Machine learning model 309 is trained on a dataset that includes target groups and reference groups. Each target group includes a group of target images and a group caption for the group of target images, while each reference group corresponds to a different one of the target groups and includes a group of reference images. The dataset is generated as discussed in more detail with respect to FIG. 1, including parsing captions scene graphs, grouping images into target groups that have shared scene graphs, and grouping images into reference groups that have scene graphs that partially overlap the scene graphs of the target groups. The training sets are used to train machine learning model 309, using the group captions as ground-truth descriptions for the target groups.

The operational context illustrated with respect to group captioning system 300 includes images 310a, 310b, 310c, 310d, and 310e. It is assumed for exemplary purposes that image 310a and 310b form a target group 311, while image 310c, 310d, and 310e form a reference group 313. In operation, embedding module 301 produces or receives initial feature embeddings for the individual images in the target group 311 and the reference group 313. The initial feature embeddings are represented symbolically in FIG. 3 as: $\Phi_{t1}$, $\Phi_{t2}$, $\Phi_{r1}$, and $\Phi_{r3}$. The feature embeddings 322 associated with target group 311, or the images themselves, are fed into self-attention module 302. Self-attention module 302 processes the embeddings to promote their prominent features, producing enhanced feature embeddings 332. The enhanced feature embeddings are represented symbolically in FIG. 3 as: $\Phi'_{t1}$, and $\Phi'_{t2}$.

The feature embeddings 323 associated with reference group 313, or the images themselves, are fed into self-attention module 303. Self-attention module 303 processes the embeddings to promote their prominent features, producing enhanced feature embeddings 333. The enhanced feature embeddings are represented symbolically in FIG. 3 as: $\Phi'_{r1}$, $\Phi'_{r2}$, and $\Phi'_{r3}$.

Embedding module 301 then combines the individual feature embeddings into group embeddings 345 for the target and reference groups by averaging the feature embeddings or performing other suitable operations on them. The group embeddings 345 include a target group embedding, a reference group embedding, and a joint embedding represented respectively in FIG. 3 as follows: $\Phi'_t$, $\Phi'_r$, and $\Phi'_j$.

Contrast module 305 generates contrastive group embeddings based on the group embeddings 345. The contrastive group embeddings include a concatenation 347 of the target group embedding and the reference group embedding, as well as a concatenation 349 of the target and group embeddings with joint information removed. As mentioned, the joint information is removed by subtracting the joint embedding from the target group embedding and subtracting the joint embedding from the reference group embedding.

Caption module 307 receives the concatenated embedding(s) and inputs them to machine learning model 309 to obtain a group caption 351. Group caption 351 summarizes the target group 311 in such a manner that its images are clearly distinguished from the reference group.

Figure 4:
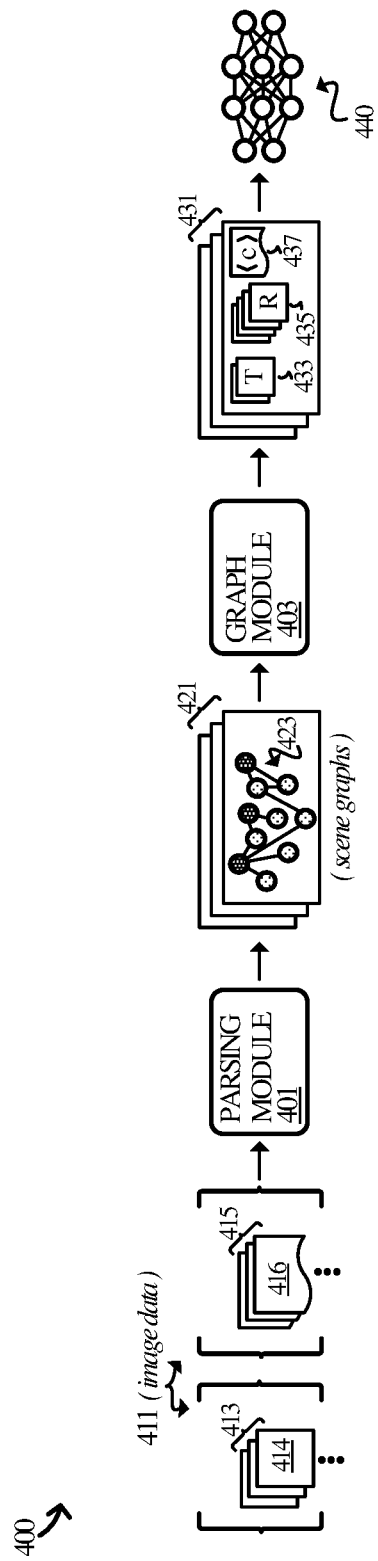
FIG. 4 illustrates a model training system in an implementation.

FIG. 4 illustrates a model training system 400 in an implementation. Model training system 400 is representative of any computer hardware, software, and/or firmware component(s) capable of training a machine learning model to generate context-aware group captions. Model training system 400 includes a parsing module 401 and a graph module 403.

Parsing module 401 is representative of any computing hardware, software, and/or firmware component(s) capable of taking image captions as input and producing scene graphs as output. Graph module 403 is representative of any computing hardware, software, and/or firmware component(s) capable of taking scene graphs as input and producing training sets as output. The training sets are used to train a machine learning model such as a random forest model, an artificial neural network, or the like.

Figure 5:
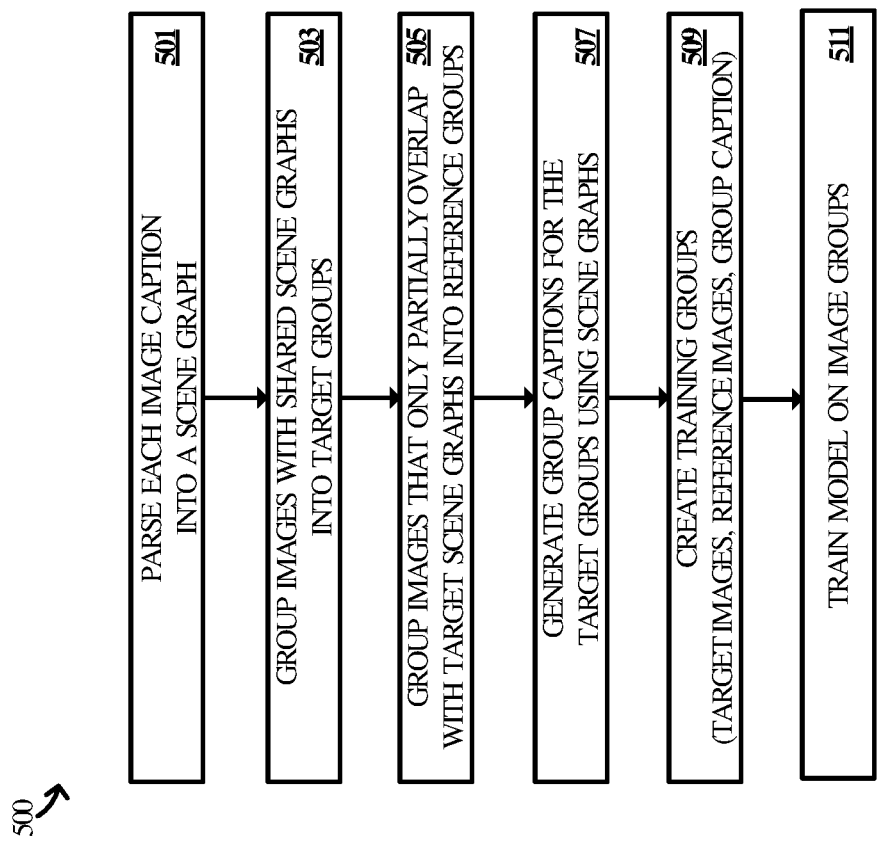
FIG. 5 illustrates a training process in an implementation.

Model training process 500, illustrated in FIG. 5, illustrates a process employed by the elements of model training system 400 to train a machine learning model. The logic of model training process 500 is implemented in the context of any of the hardware, software (e.g. program instructions), or firmware that include model training process 500. The logic, in the form of program instructions, circuitry, or the like, directs its host computing device(s) to operate as described for model training process 500, referring parenthetically to the steps in FIG. 5 and in the operational context of FIG. 4.

Model training process 500 begins with a dataset that includes a set of images to be separated into target groups and reference groups. Each image in the set includes a corresponding image caption that describes the scene in the individual image. Model training process 500 parses each image caption in the data set into a scene graph (step 501) and the scene graphs are used for grouping the images.

Next, model training process 500 groups images with shared scene graphs into target groups (step 503). Model training process 500 also groups images with scene graphs that partially overlap those of the target images into reference groups (step 505). In other words, the target groups are identified, and then suitable reference groups are found for the target groups.

Model training process 500 then generates group captions for the target groups using the natural language from the scene graphs (step 507). For example, the specific words from the portions of scene graphs that overlap completely with each other become the words that populate a group caption for a group of target images.

From there, model training process 500 creates training sets that include a given target group, its corresponding reference group, and the group caption generated for the target group (step 509). In the aggregate, multiple training sets are created to be used to train the machine learning model to generate group captions for new sets of images (step 511).

As applied to FIG. 4, image data 411 includes images 413 and captions 415 corresponding to the images. In other words, each individual image 414 in images 413 corresponds to an individual caption 416 of the captions 415. The captions 415 are input to parsing module 401, which parses the natural language descriptions of the captions 415 into scene graphs 421. Each individual scene graph 423 in the set of graphs corresponds to an individual one of the captions, and thus to an individual one of the images. The scene graphs include nodes and edges that represent the nouns, verbs, subjects, objects, and other such grammatical elements of the captions (and therefore the scenes in the images), as well as their connections or relations to each other.

Graph module 403 compares the scene graphs 421 to one another in order to find those with shared scene graphs. Those with shared scene graphs are designated as target groups, and those with partially overlapping scene graphs serve as the reference groups. Graph module 403 (or some other component) also produces group captions for the target groups using the text from the overlapping portions of the respective captions.

The resulting target groups, reference groups, and group captions, are then assembled or organized into training sets 431. Each training group includes a group of target images 433, a group of reference images 435, and a group caption 437 that describes the group. The training sets 431 are used to training machine learning model 440 to generate context-aware group captions for new groups of images.

Figure 6:
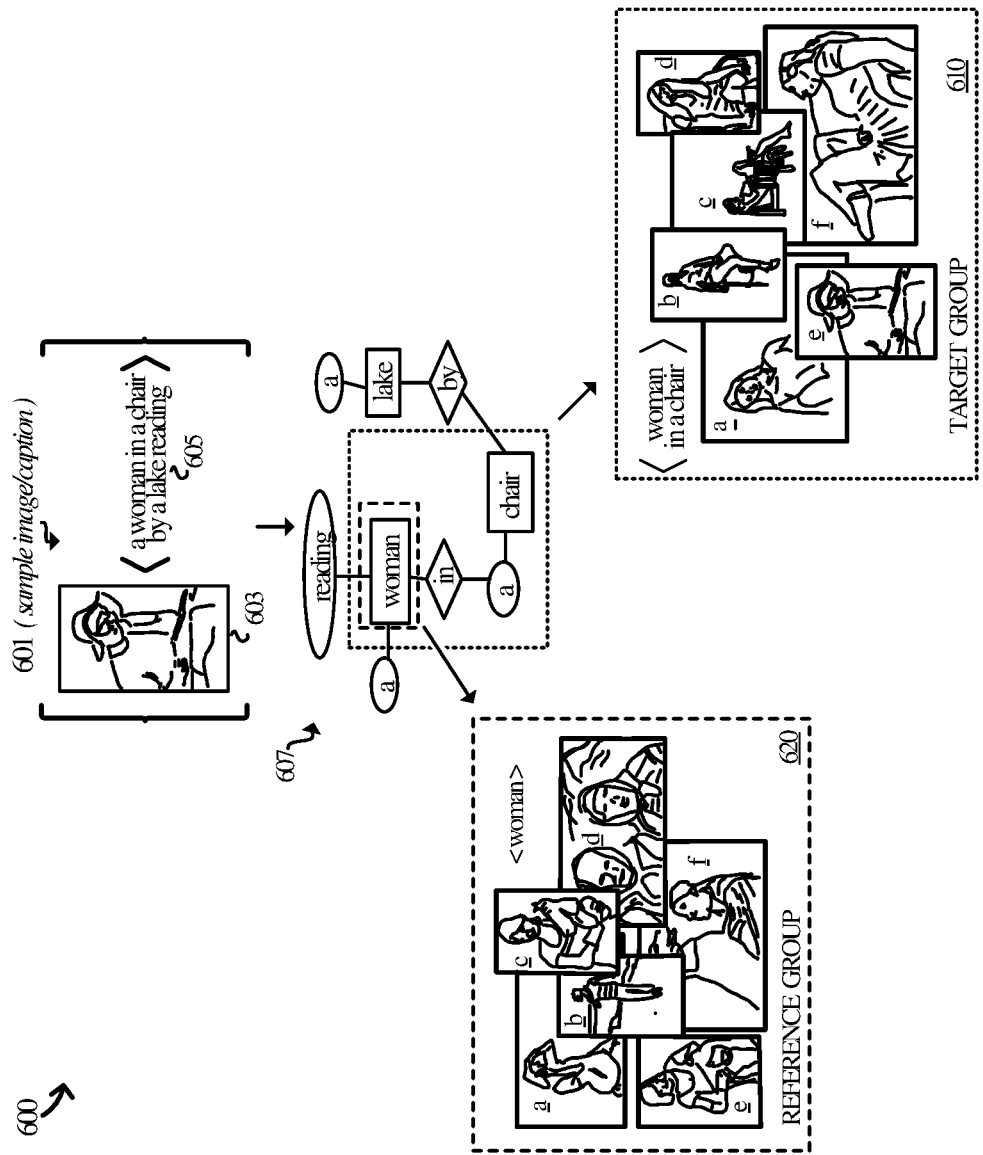
FIG. 6 illustrates an operational scenario in an implementation.

FIG. 6 illustrates an operational scenario 600 in an example of model training process 500. In operation, a sample dataset 601 includes an image 603 and a caption 605 describing the image. In this case, the image 603 is described by the caption 605 as a scene of "a woman in a chair by a lake reading."

A parsing engine (e.g. parsing module 401) parses the elements of the caption 605 into a scene graph 607. The scene graph 607 includes the words from the caption 605 and their semantic and/or grammatical relationship with one another. The parsing engine compares the scene graph 607 to the scene graphs of other images in the dataset to find those that overlap sufficiently with scene graph 607 to form a target group. If the target group already exists or is being constructed, then the analysis is whether to accept image 603 as a new member of the target group. The image parser also finds images to serve as a suitable reference group for the target group.

In this example, the target group 610 includes various images of women sitting in chairs represented by image 610a, image 610b, image 610c, image 610d, image 610e, and image 610f. The reference group 620 includes images of women in general represented by image 620a, image 620b, image 620c, image 620d, image 620e, and image 620f. The resulting training group, in one example, is composed of the images in target group 610, the images in reference group 620, and the group caption formulated for target group 610 ("woman in a chair").

FIG. 7 illustrates computing system 701 that is representative of any system or collection of systems in which the various components, modules, processes, programs, and scenarios disclosed herein are implemented. Examples of computing system 701 include, but are not limited to, server computers, cloud computing platforms, and data center equipment, as well as any other type of physical or virtual server machine, container, and any variation or combination thereof. Other examples include desktop computers, laptop computers, tablet computers, Internet of Things (IoT) devices, wearable devices, and any other physical or virtual combination or variation thereof.

Computing system 701 is implemented as a single apparatus, system, or device or is implemented in a distributed manner as multiple apparatuses, systems, or devices. Computing system 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements captioning process 706, which is representative of the captioning processes discussed with respect to the preceding Figures. Software 705 also includes and implements training process 716, which is representative of the model training processes discussed with respect to the preceding Figures. When executed by processing system 702 to provide enhanced group captioning, software 705 directs processing system 702 to operate as described herein for at least the various processes, operational scenarios, and sequences discussed in the foregoing implementations. Computing system 701 optionally includes additional devices, features, or functionality not discussed for purposes of brevity.

Referring still to FIG. 7, processing system 702 includes a micro-processor and other circuitry that retrieves and executes software 705 from storage system 703. Processing system 702 is implemented within a single processing device are is distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 includes any computer readable storage media readable by processing system 702 and capable of storing software 705. Examples of computer readable storage media include volatile and nonvolatile, removable and non-removable media implemented in any method or technology for storage of information, such as computer readable instructions, data structures, program modules, or other data. Examples of storage media further include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 also includes computer readable communication media over which at least some of software 705 is communicated internally or externally in some implementations. Storage system 703 is implemented as a single storage device are across multiple storage devices or sub-systems co-located or distributed relative to each other. Storage system 703 includes additional elements in some implementations, such as a controller, capable of communicating with processing system 702 or possibly other systems.

Software 705 (including image captioning process 706 training process 716) is implemented in program instructions and among other functions, when executed by processing system 702, directs computing system 701 to operate as described with respect to the various operational scenarios, sequences, and processes illustrated herein. For example, software 705 includes program instructions for implementing enhanced group captioning as described herein.

In particular, the program instructions include various components or modules that cooperate or otherwise interact to carry out the various processes and operational scenarios described herein. The various components or modules are embodied in compiled or interpreted instructions, or in some other variation or combination of instructions. The various components or modules are executed in a synchronous or asynchronous manner, serially or in parallel, in a single threaded environment or multi-threaded, or in accordance with any other suitable execution paradigm, variation, or combination thereof. Software 705 optionally includes additional processes, programs, or components, such as operating system software, virtualization software, or other application software. In some implementations, software 705 also includes firmware or some other form of machine-readable processing instructions executable by processing system 702.

Software 705, when loaded into processing system 702 and executed, transforms a suitable apparatus, system, or device (of which computing system 701 is representative) overall from a general-purpose computing system into a special-purpose computing system customized to provide enhanced group captioning. Indeed, encoding software 705 on storage system 703 transforms the physical structure of storage system 703. The specific transformation of the physical structure depends on various factors in different implementations of this description. Examples of such factors include, but are not limited to, the technology used to implement the storage media of storage system 703 and whether the computer-storage media are characterized as primary or secondary storage, as well as other factors.

For example, if the computer readable storage media are implemented as semiconductor-based memory, software 705 transforms the physical state of the semiconductor memory when the program instructions are encoded therein, such as by transforming the state of transistors, capacitors, or other discrete circuit elements constituting the semiconductor memory. A similar transformation occurs with respect to magnetic or optical media. Other transformations of physical media are possible without departing from the scope of the present description, with the foregoing examples provided only to facilitate the present discussion.

Communication interface system 707 includes communication connections and devices that allow for communication with other computing systems (not shown) over communication networks (not shown). Examples of connections and devices that together allow for inter-system communication include network interface cards, antennas, power amplifiers, RF circuitry, transceivers, and other communication circuitry. The connections and devices communicate over communication media to exchange communications with other computing systems or networks of systems, such as metal, glass, air, or any other suitable communication media. The aforementioned media, connections, and devices are well known and need not be discussed at length here.

Communication between computing system 701 and other computing systems (not shown), occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above can be combined in various ways to form multiple embodiments. As a result, the invention is not limited to the specific embodiments described above, but only by the claims and their equivalents.

What is claimed is:

1. A method of generating captions for image groups, the method comprising:
    in an embedding module:
        generating a target embedding for a group of target images; and
        generating a reference embedding for a group of reference images;
    in a contrast module:
        identifying joint information in-common between the group of target images and the group of reference images;
        removing the joint information from the target embedding and the reference embedding, resulting in a contrastive target embedding and a contrastive reference embedding;
        generating a contrastive group embedding based at least on the contrastive target embedding and the contrastive reference embedding; and
        submitting the contrastive group embedding to a model to obtain a group caption for the group of target images.

2. The method of claim 1 wherein:
    the model includes a self-attention layer configured to identify and promote prominent features of image groups;
    generating the target embedding for the group of target images comprises submitting the group of target images to the model to obtain the target embedding; and
    generating the reference embedding for the group of reference images comprises submitting the group of reference images to the model to obtain the reference embedding.

3. The method of claim 1 further comprising training the model on a dataset comprising target groups and reference groups, wherein:
    each of the target groups comprises a corresponding group of target images and a corresponding group caption for the group of target images; and
    each of the reference groups corresponds to a different one of the target groups and comprises a corresponding group of reference images.

4. The method of claim 3 further comprising generating the dataset on which to train the model by at least:
    parsing each image caption, in a set of image captions corresponding to a set of training images, into a scene graph;
    identifying the target groups from within the set of training images, wherein each of the target groups comprises a subset of the set of training images having a shared scene graph;
    identifying the reference groups from within the set of training images, wherein each of the reference groups corresponds to a different one of the target groups and comprises a different subset of the set of training images having scene graphs that only partially overlap with the shared scene graph of a corresponding one of the target groups; and
    generating the group caption for each of the target groups based at least on the shared scene graph for a given target group.

5. The method of claim 1 wherein:
    identifying the joint information in-common between the group of target images and the group of reference images comprises generating a joint embedding for a joint group of images that includes the group of target images and the group of reference images; and
    removing the joint information from the target embedding and the reference embedding comprises subtracting the joint embedding from the target embedding, to produce the contrastive target embedding, and subtracting the joint embedding from the reference embedding, to produce the contrastive reference embedding.

6. The method of claim 1 wherein:
    the group of target images comprises a subset of images returned by a query;
    the group of reference images comprises a different subset of the images returned by the query; and
    the method further comprises generating a refinement to the query based on the group caption generated for the group of target images.

7. The method of claim 1 wherein the contrastive group embedding comprises a concatenation of the contrastive target embedding and the contrastive reference embedding.

8. A computing apparatus comprising:
one or more computer readable storage media;
one or more processors operatively coupled to the one or more computer readable storage media; and
program instructions stored on the one or more computer readable storage media and comprising:
an embedding module that, when executed by the one or more processors, direct the computing apparatus to:
generate a target embedding for a group of target images; and
generate a reference embedding for a group of reference images; and
a contrast module that, when executed by the one or more processors, directs the computing apparatus to:
identify joint information in-common between the group of target images and the group of reference images;
remove the joint information from the target embedding and the reference embedding, to produce a contrastive target embedding and a contrastive reference embedding;
generate a contrastive group embedding based at least on the contrastive target embedding and the contrastive reference embedding; and
generate a group caption for the group of target images based at least on processing the contrastive group embedding using a model.

9. The computing apparatus of claim 8 wherein, to generate the group caption for the group of target images, the program instructions when executed by the one or more processors direct the computing apparatus to input the contrastive group embedding to the model to obtain the group caption.

10. The computing apparatus of claim 9 wherein:
the model includes a self-attention layer configured to identify and promote prominent features of image groups;
to generate the target embedding for the group of target images, the program instructions when executed by the one or more processors direct the computing apparatus to input the group of target images to the model to obtain the target embedding; and
to generate the reference embedding for the group of reference images, the program instructions when executed by the one or more processors direct the computing apparatus to input the group of reference images to the model to obtain the reference embedding.

11. The computing apparatus of claim 9 wherein:
the model comprises an artificial neural network trained on a dataset comprising target groups and reference groups:
each of the target groups comprises a corresponding group of target images and a corresponding group caption for the group of target images; and
each of the reference groups corresponds to a different one of the target groups and comprises a corresponding group of reference images.

12. The computing apparatus of claim 8 wherein:
to identify the joint information in-common between the group of target images and the group of reference images, the program instructions when executed by the one or more processors direct the computing apparatus to generate a joint embedding for a joint group of images that includes the group of target images and the group of reference images; and
to remove the joint information from the target embedding and the reference embedding, the program instructions when executed by the one or more processors direct the computing apparatus to subtract the joint embedding from the target embedding, and to subtract the joint embedding from the reference embedding, to produce the contrastive target embedding and the contrastive reference embedding, respectively.

13. The computing apparatus of claim 8 wherein:
the group of target images comprises a subset of images returned by a query;
the group of reference images comprises a different subset of the images returned by the query; and
the program instructions when executed by the one or more processors further direct the computing apparatus to generate a refinement to the query based on the group caption generated for the group of target images.

14. The computing apparatus of claim 8 wherein the contrastive group embedding comprises a concatenation of the contrastive target embedding and the contrastive reference embedding.

15. A method comprising:
generating a target embedding for a group of target images;
generating a reference embedding for a group of reference images;
identifying joint information in-common between the group of target images and the group of reference images;
removing the joint information from the target embedding and the reference embedding, resulting in a contrastive target embedding and a contrastive reference embedding;
generating a contrastive group embedding based at least on the contrastive target embedding and the contrastive reference embedding; and
submitting the contrastive group embedding to a model to obtain a group caption for the group of target images.

16. The method of claim 15 wherein:
the model includes a self-attention layer configured to identify and promote prominent features of image groups;
generating the target embedding for the group of target images comprises submitting the group of target images to the model to obtain the target embedding; and
generating the reference embedding for the group of reference images comprises submitting the group of reference images to the model to obtain the reference embedding.

17. The method of claim 15 further comprising training the model on a dataset comprising target groups and reference groups, wherein:
each of the target groups comprises a corresponding group of target images and a corresponding group caption for the group of target images; and
each of the reference groups corresponds to a different one of the target groups and comprises a group of reference images.

18. The method of claim 17 further comprising generating the dataset on which to train the model by at least:
parsing each image caption, in a set of image captions corresponding to a set of training images, into a scene graph;

identifying the target groups from within the set of training images, wherein each of the target groups comprises a subset of the set of training images having a shared scene graph;

identifying the reference groups from within the set of training images, wherein each of the reference groups corresponds to a different one of the target groups and comprises a different subset of the set of training images having scene graphs that only partially overlap with the shared scene graph of a corresponding one of the target groups; and generating the group caption for each of the target groups based at least on the shared scene graph for a given target group.

19. The method of claim 15 wherein:

identifying the joint information in-common between the group of target images and the group of reference images comprises generating a joint embedding for a joint group of images that includes the group of target images and the group of reference images; and removing the joint information from the target embedding and the reference embedding comprises subtracting the joint embedding from the target embedding, to produce the contrastive target embedding, and subtracting the joint embedding from the reference embedding, to produce the contrastive reference embedding.

20. The method of claim 15 wherein:

the group of target images comprises a subset of images returned by a query;

the group of reference images comprises a different subset of images returned by the query; and the method further comprises generating a refinement to the query based on the group caption generated for the group of target images.

* * * * *

UNITED STATES PATENT AND TRADEMARK OFFICE
CERTIFICATE OF CORRECTION

| | |
|---|---|
| PATENT NO. | : 11,790,650 B2 |
| APPLICATION NO. | : 16/998876 |
| DATED | : October 17, 2023 |
| INVENTOR(S) | : Quan Hung Tran et al. |

It is certified that error appears in the above-identified patent and that said Letters Patent is hereby corrected as shown below:

In the Claims

Column 14, Line 64 (Approx.), Claim 6: In the line reading "of the images returned by the query; and" should read --of images returned by the query; and--.

Column 16, Line 61 (Approx.), Claim 17: In the line reading "of the target groups and comprises a group of reference" should read --of the target groups and comprises a corresponding group of reference--.

Signed and Sealed this
Ninth Day of January, 2024

*Katherine Kelly Vidal*

Katherine Kelly Vidal
*Director of the United States Patent and Trademark Office*